(12) United States Patent
Diskin et al.

(10) Patent No.: US 11,426,023 B2
(45) Date of Patent: Aug. 30, 2022

(54) BEVERAGE BREWING APPARATUS

(71) Applicant: Helen of Troy Limited, St. Michael (BB)

(72) Inventors: Christopher Diskin, New York, NY (US); Nicholas Reynolds, New York, NY (US); Lynna Borden, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 737 days.

(21) Appl. No.: 16/292,605

(22) Filed: Mar. 5, 2019

(65) Prior Publication Data
US 2020/0281392 A1 Sep. 10, 2020

(51) Int. Cl.
A47J 31/02 (2006.01)
A47J 31/06 (2006.01)

(52) U.S. Cl.
CPC ............. *A47J 31/02* (2013.01); *A47J 31/061* (2013.01)

(58) Field of Classification Search
CPC ................................ A47J 31/02; A47J 31/061
See application file for complete search history.

(56) References Cited

U.S. PATENT DOCUMENTS

| | | |
|---|---|---|
| 1,687,095 A | 10/1928 | Jones |
| 2,835,188 A | 5/1958 | Graham |
| 4,386,109 A | 5/1983 | Bowen et al. |
| 4,924,922 A | 5/1990 | Johnson |
| 5,775,526 A | 7/1998 | Overy |
| 5,813,317 A | 9/1998 | Chang |
| 5,826,493 A | 10/1998 | Tien Lin |
| 5,880,441 A | 3/1999 | Hartman |
| 5,884,551 A * | 3/1999 | Orrico ...................... A23F 5/26 426/433 |
| 6,026,733 A | 2/2000 | Orrico |
| 6,058,827 A | 5/2000 | Lin Tien |
| 6,164,190 A | 12/2000 | Tien Lin |
| 6,327,965 B1 | 12/2001 | Lin Tien |
| 8,485,089 B2 | 7/2013 | Taylor et al. |

(Continued)

FOREIGN PATENT DOCUMENTS

| | | |
|---|---|---|
| DE | 7736028 | 3/1978 |
| EP | 1123675 | 8/2001 |

OTHER PUBLICATIONS

International Search Report filed in PCT/US2020/018965 dated May 19, 2020.

*Primary Examiner* — Omar Flores Sanchez
(74) *Attorney, Agent, or Firm* — Rankin, Hill & Clark LLP

(57) ABSTRACT

A beverage brewing apparatus includes a body including a body side wall having an inner surface and an outer surface. A base is removably connected to the body and includes a base side wall and a top wall. The base side wall has an inner surface and an outer surface. A valve assembly is mounted to the base. The valve assembly includes a valve plate and a valve seal connected to the valve plate. The valve seal is movable from a closed position where the valve seal is in contact with the top wall and an open position. A filter assembly is mounted to the base, and includes a filter having a peripheral edge and a gasket having a flange. The gasket is secured to the peripheral edge of the filter, and assembling the body, base, and filter assembly secures the gasket flange between the body and the base.

16 Claims, 9 Drawing Sheets

(56) References Cited

U.S. PATENT DOCUMENTS

| | | |
|---|---|---|
| 9,179,796 B2 | 11/2015 | Krul et al. |
| 2004/0020922 A1 | 2/2004 | Alves |
| 2005/0211102 A1 | 9/2005 | Vu |
| 2008/0022859 A1 | 1/2008 | Marconi |
| 2012/0017766 A1 | 1/2012 | Anson |
| 2012/0160107 A1 | 6/2012 | Tien |
| 2012/0216682 A1 | 8/2012 | Bodum |
| 2012/0251682 A1 | 10/2012 | Meyl |
| 2012/0312173 A1 | 12/2012 | Geissler |
| 2013/0019754 A1 | 1/2013 | Tien |
| 2013/0022717 A1 | 1/2013 | Meyl |
| 2014/0008310 A1 | 1/2014 | Weston |
| 2014/0339177 A1 | 11/2014 | Lane |
| 2015/0223628 A1* | 8/2015 | Cheung ............ A47J 31/005 99/296 |
| 2020/0359826 A1* | 11/2020 | Umana ............ A47J 31/10 |

* cited by examiner

US 11,426,023 B2

BEVERAGE BREWING APPARATUS

BACKGROUND

Beverage brewing apparatuses are well known. Typically, such an apparatus includes a body for brewing a beverage, a filter for separating the brewed beverage from solids used in the brewing process, and means for dispensing the brewed beverage. One known problem with beverage brewing apparatuses relates to ease of use and maintenance due to an excessive number of parts and intricate assembly process. Further, beverage brewing apparatuses assembled using threaded surfaces are often difficult to screw together due to excessive friction between mated surfaces.

SUMMARY

According to one aspect, a beverage brewing apparatus comprises a body including a body side wall having an inner surface defining an interior of the body and an outer surface defining an exterior of the body. A base is removably connected to the body. The base includes a base side wall and a top wall. The base side wall has an inner surface defining an interior of the base and an outer surface defining an exterior of the base. A valve assembly is mounted to the base. The valve assembly includes a valve plate and a valve seal connected to the valve plate. The valve seal is movable from a closed position where the valve seal is in contact with the top wall and an open position. A filter assembly is mounted to the base. The filter assembly includes a filter having a peripheral edge and a gasket having a flange. The gasket is secured to the peripheral edge of the filter, and assembling the body, base, and filter assembly secures the gasket flange between the body and the base.

According to another aspect, a beverage brewing apparatus comprises a body including a body side wall having an inner surface defining an interior of the body and an outer surface defining an exterior of the body. A base is removably connected to the body. The base includes a base side wall and a top wall. The base side wall has an inner surface defining an interior of the base and an outer surface defining an exterior of the base. A valve assembly is mounted to the base. The valve assembly includes a valve plate and a valve seal connected to the valve plate. The valve seal is movable from a closed position where the valve seal is in contact with the top wall and an open position. A filter assembly is mounted to the base. The filter assembly includes a filter secured to a casing and a gasket mounted to the casing, and assembling the body, base, and filter assembly secures both the casing and the gasket of the filter assembly between the body and the base.

DETAILED DESCRIPTION

Figure 1:
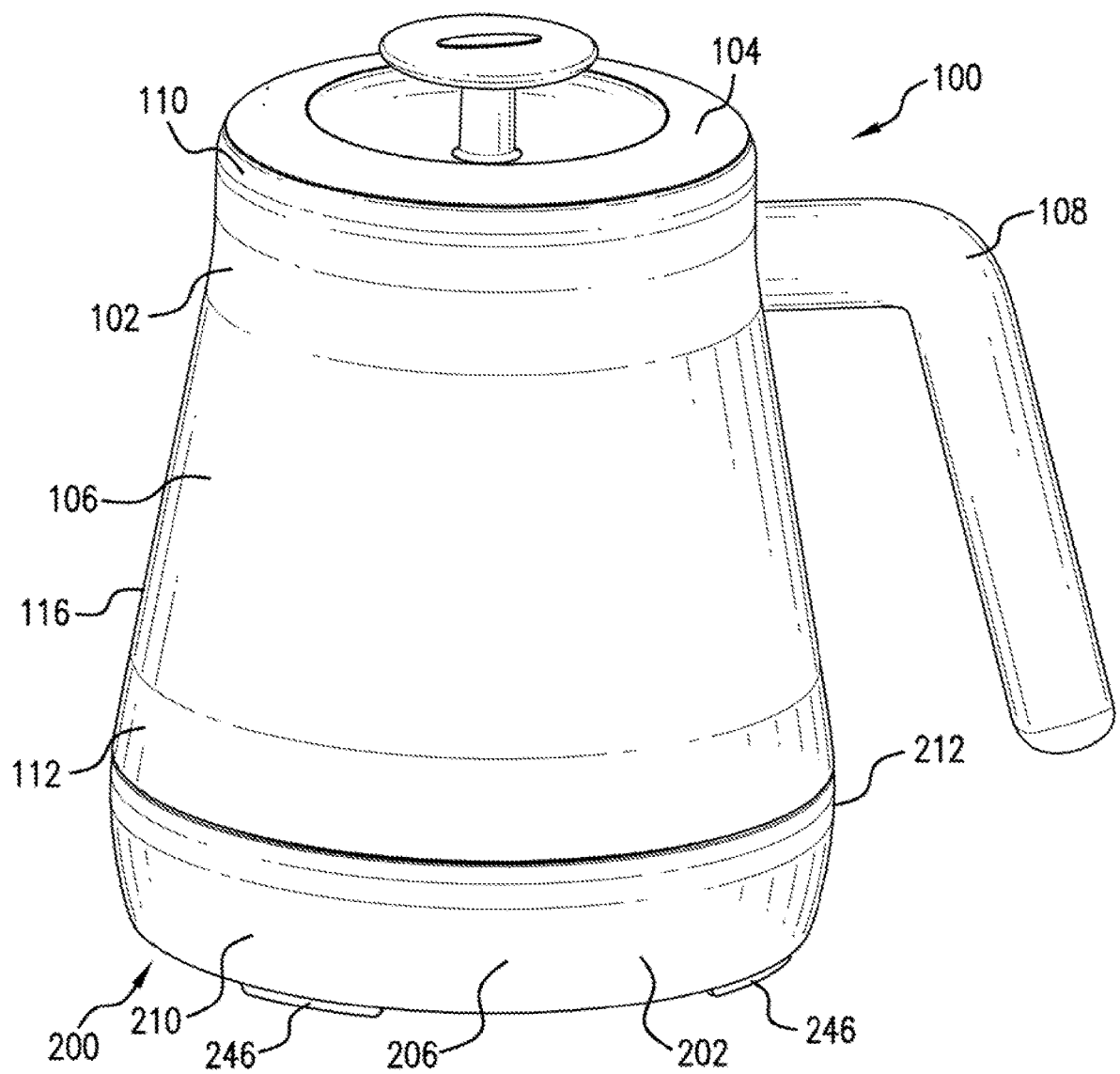
FIG. 1 is a perspective view of a beverage brewing apparatus according to the present disclosure.
Figure 2:
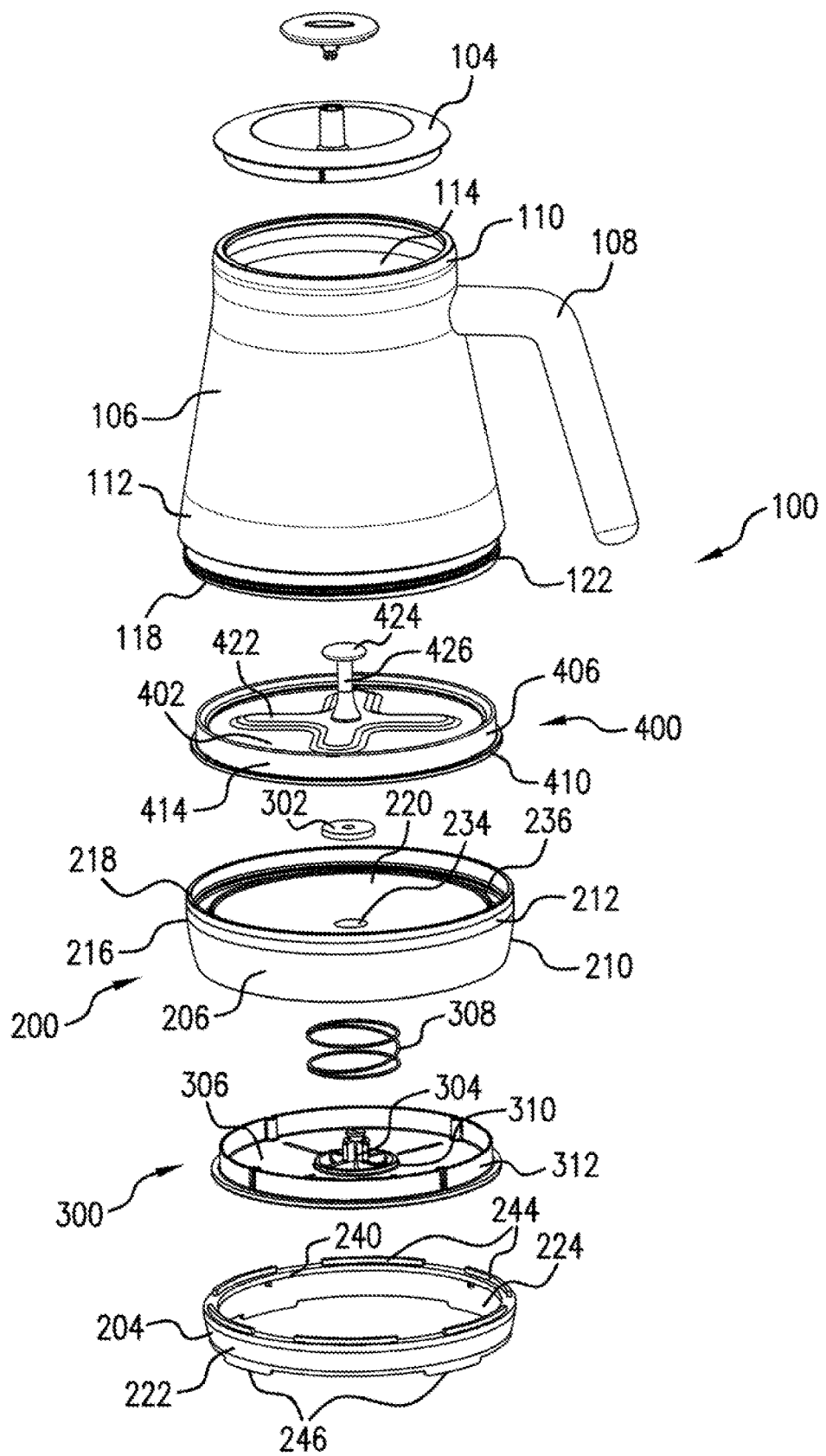
FIG. 2 is an exploded perspective view of the beverage brewing apparatus of FIG. 1.
Figure 3:
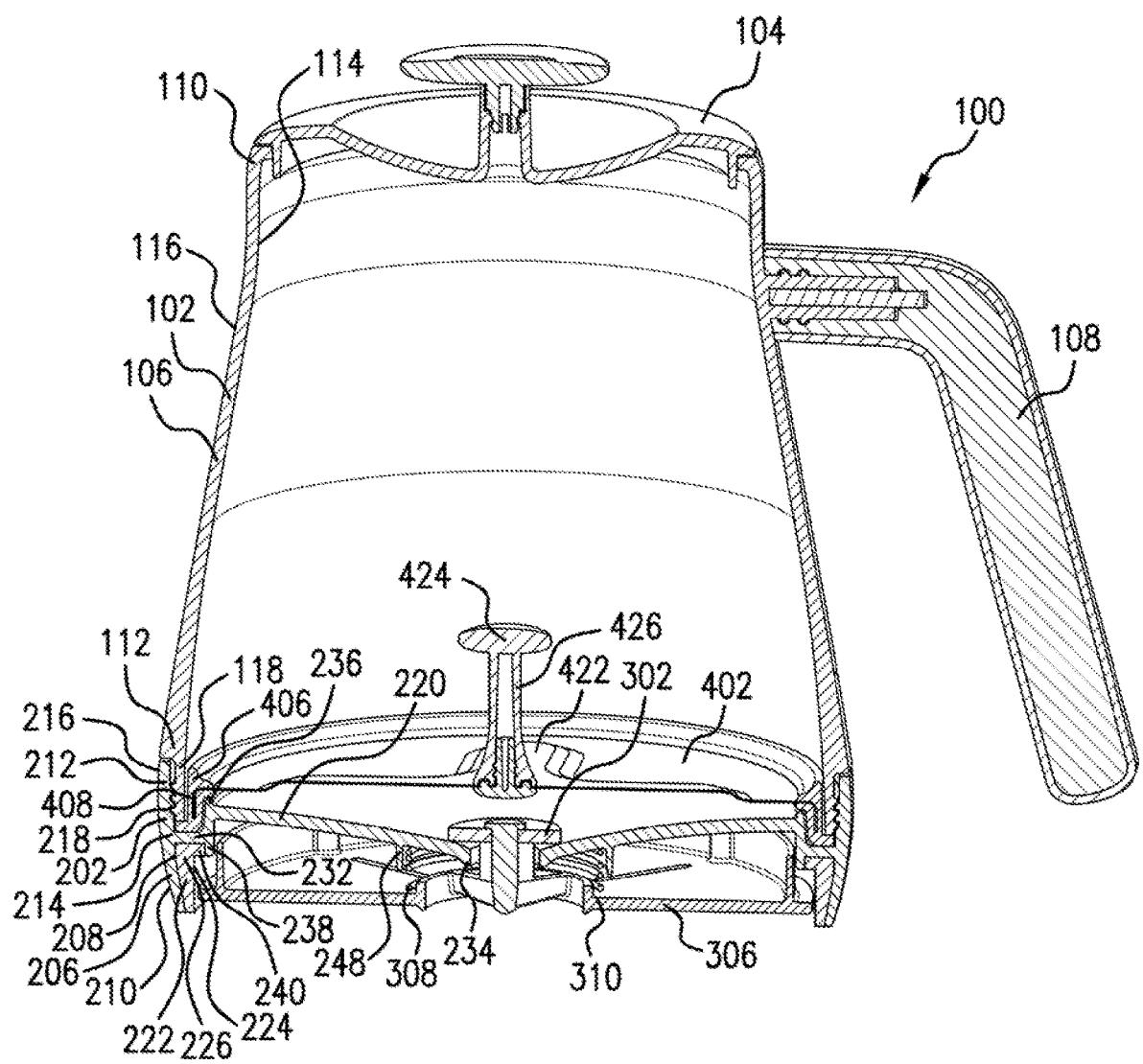
FIG. 3 is a cross-sectional view of the beverage brewing apparatus of FIG. 1.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 illustrate a beverage brewing apparatus 100 according to the present disclosure. The beverage brewing apparatus 100 as shown includes a body 102, a base 200, and a lid 104. The body 102 has a body side wall 106, and a handle 108 can extend outwardly from the body side wall 106. The body side wall 106 defines an open top portion 110 and an open bottom portion 112. The base 200 is removably connected to the open bottom portion 112 and the lid 104 is seated in the open top portion 110. As depicted, the body side wall 106 has an inner surface 114 defining an interior of the body 102, and an outer surface 116 defining an exterior of the body 102. A flange 118 which is offset inwardly from the outer surface 116 is provided about a periphery of the open bottom portion 112. The flange 118 includes an inner surface 120, which is an extension of the inner surface 114 of the body side wall, and a threaded outer surface 122 configured for engaging the base 200.

The base 200 includes an outer base 202 and an inner base 204 disposed within the outer base. The outer base 202 has a base side wall 206 having an inner surface 208 defining an interior of the base 200, and an outer surface 210 defining an exterior of the base 200. The inner surface 208 of the base side wall 206 is configured to retain the inner base 204 from moving downward relative to the outer base 202 when the outer base 202 is assembled with the inner base 204. A flange 212 which is offset outwardly from the inner surface 208 is provided about a periphery of a top portion 214 of the base side wall 206. The flange 212 includes an outer surface 216, which is an extension of the outer surface 210 of the base side wall 206, and a threaded inner surface 218 for engaging the threaded outer surface 122 of the flange 118. In the depicted aspect, the base 200 includes a top wall 220 extending inward from the inner surface 208 of the base side wall 206. The inner base 204 includes a side wall 222 including an inward facing surface 224 and a base top portion 226. It should be appreciated that the side wall 222 can be wedge shaped for engaging the base side wall 206, and this engagement prevents downward movement of the inner base 204 relative to the outer base 202.

Figure 4:
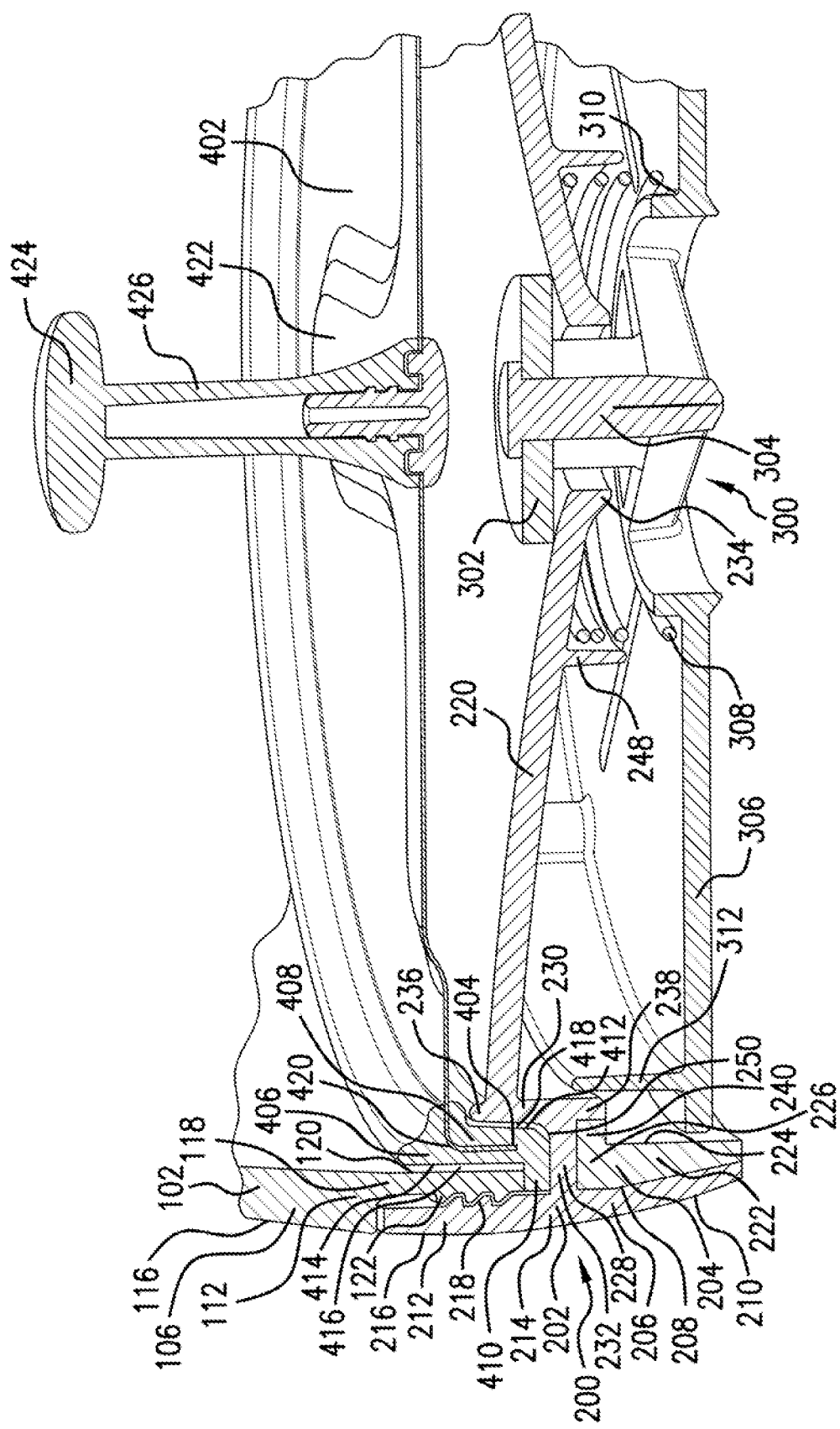
FIG. 4 is a partially enlarged view of FIG. 3.
Figure 5:
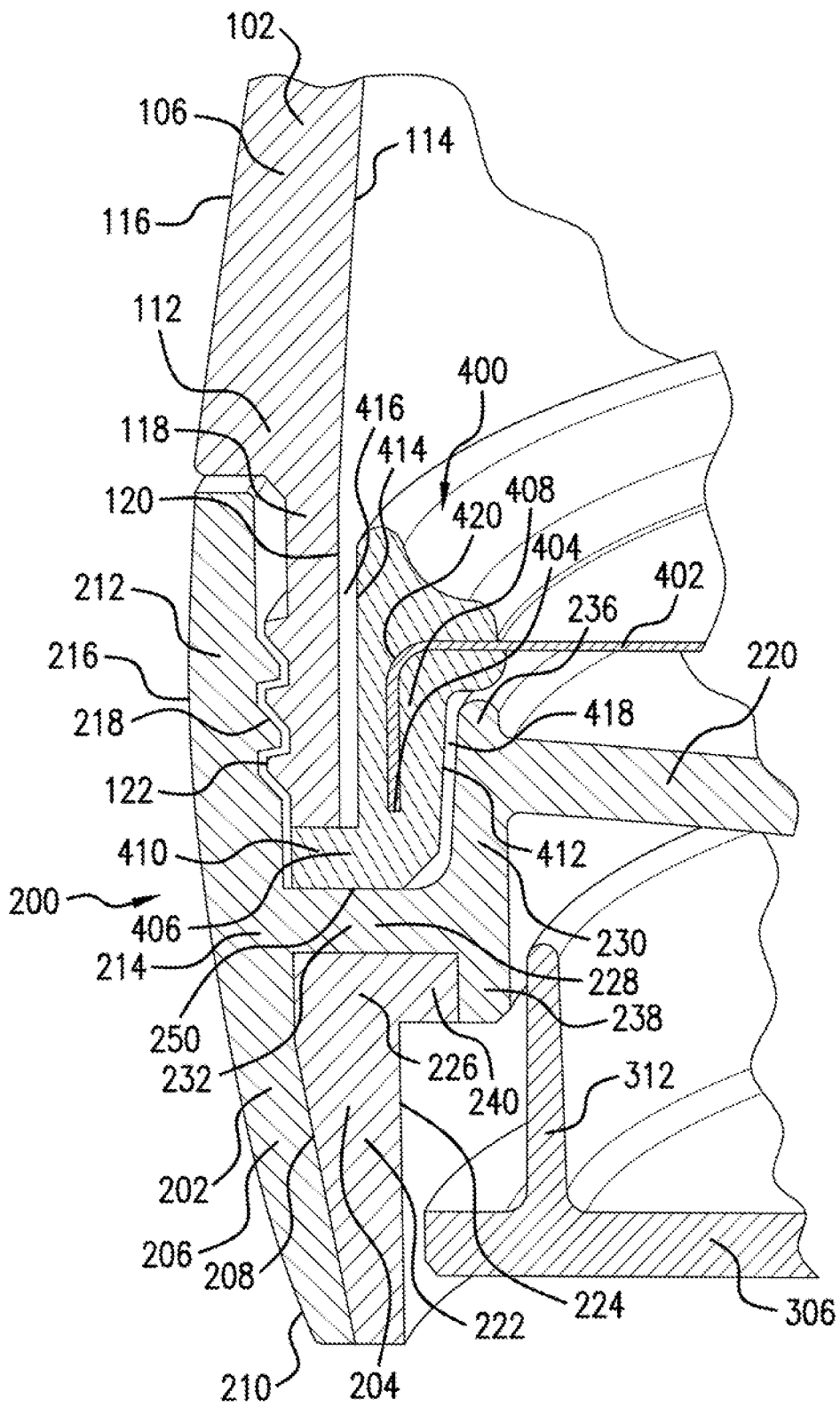
FIG. 5 is a partially enlarged view of FIG. 4.
Figure 6:
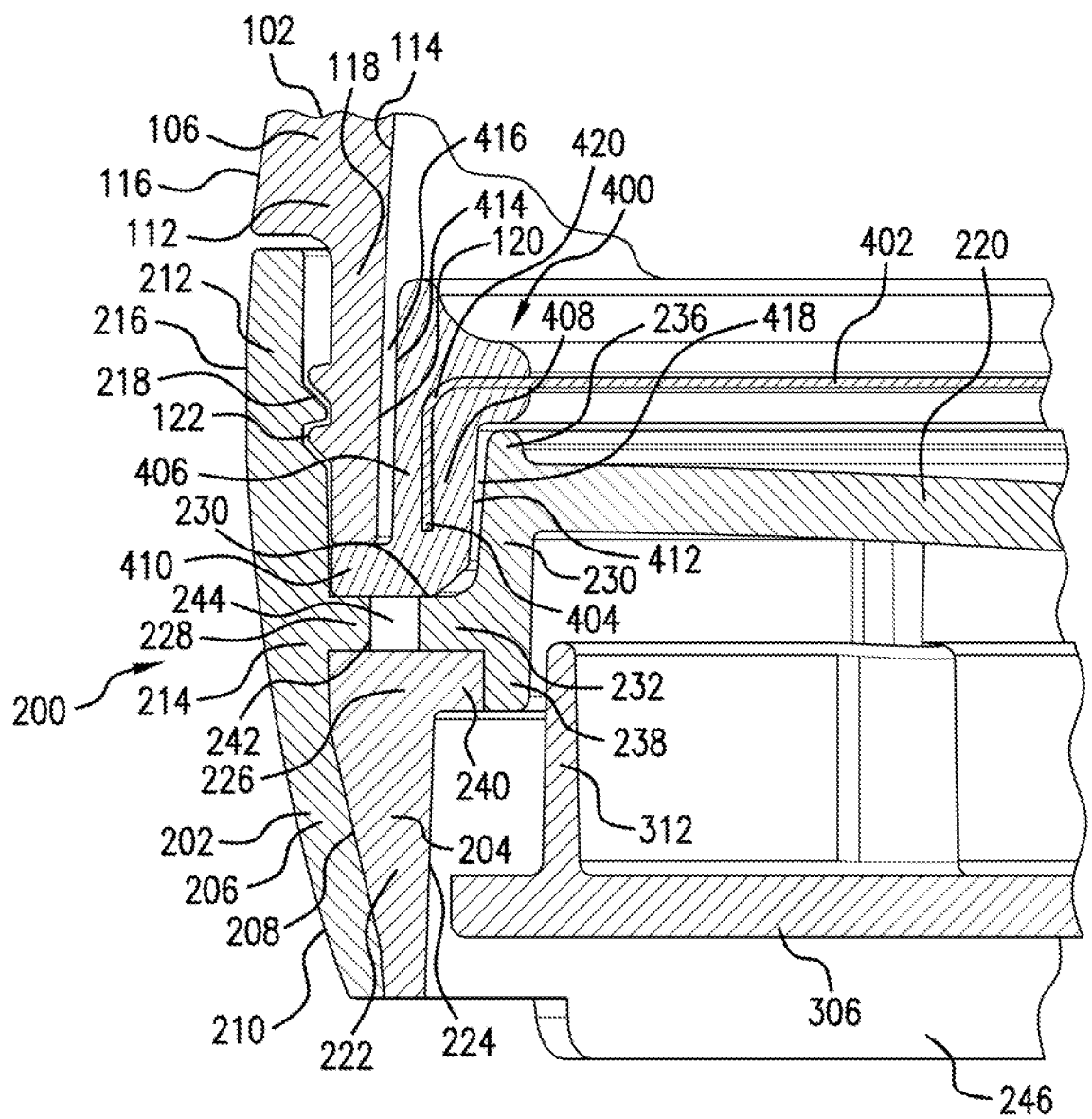
FIG. 6 is a cross-sectional view of the beverage brewing apparatus of FIG. 1.
Figure 7:
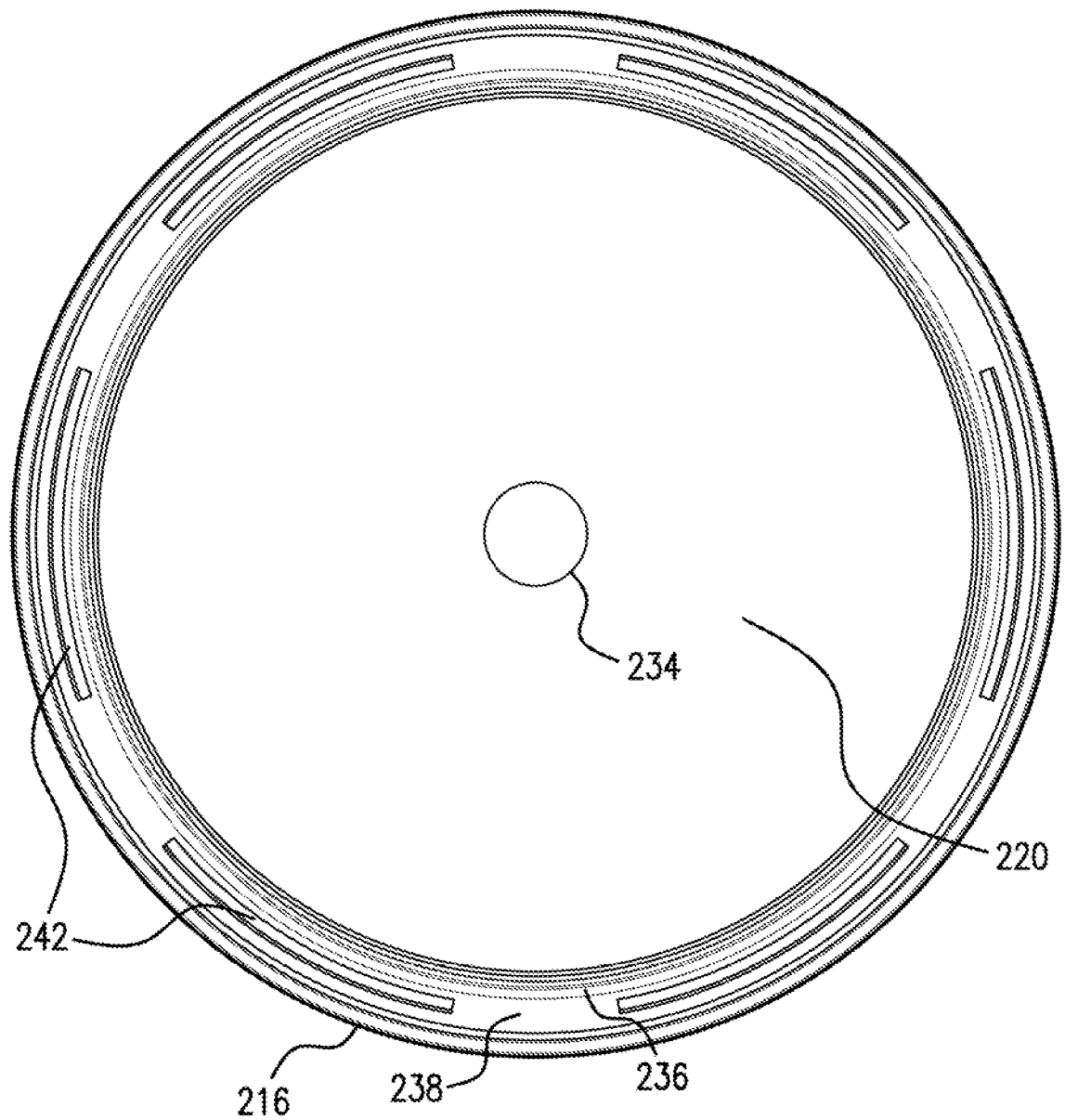
FIG. 7 is a top view of a base of the beverage brewing apparatus of FIG. 1.

As depicted in FIGS. 3-5, the top wall 220 can include a generally L-shaped side portion 228 which integrally extends between the inner surface 208 of the base side wall 206 and the top wall 220. The L-shaped side portion 228 includes a substantially vertical segment 230 and a substantially horizontal segment 232. The top wall 220 can be generally funnel shaped, having a central opening 234 which allows for a brewed beverage to flow through the top wall 220. The top wall 220 further integrally includes at least one upwardly extending top ridge 236, which may be disposed about the periphery of the top wall 220 inwardly of the side portion 228. The top wall 220 further integrally includes a downwardly extending bottom ridge 238, which may be disposed about the periphery of the top wall 220, and inwardly of the horizontal segment 232 of the side portion 228. The inner base 204 includes a flange 240 disposed on the inward facing surface 224 of the side wall 222, at the base top portion 226 of the inner base 204. The flange 240 extends towards the bottom ridge 238 of the top wall 220. As described, the top wall 220 is integral with the base 200 to define a unitary, one-piece structure; although, it should be appreciated that the top wall 220 can be separate from the base 200 to define a separate structure. As depicted in FIGS. 6 and 7, the substantially horizontal segment 232 of the side portion 228 defines base openings 242 disposed between the base side wall 206 and the vertical segment 230 of the side portion 228. The base openings 242 are through holes configured for receiving top protrusions 244 extending upwardly from the inner base 204. When the brewing apparatus 100 is assembled, the base openings 242 and the top protrusions 244 are located in a circular pattern that is concentric with the central opening 234 of the top wall 220. The inner base 204 also features bottom protrusions 246 that extend downward from the inner base 204 for supporting the brewing apparatus 100 on a flat surface.

FIGS. 3 and 4 depict a valve assembly mount to the base 200. According to one aspect, the valve assembly includes a valve 300 mounted to the top wall 220 of the base 200. In the depicted embodiment, the valve 300 includes a valve seal 302 mounted to one end portion of an actuator stem 304, which extends outwardly from, and is provided as part of a valve plate 306. The valve seal 302 is upwardly displaceable between a closed position where the valve seal 302 closes the central opening 234 in the top wall 220 and an opened position. To allow for this movement, a compression spring 308 is mounted on the actuator stem 304 and positioned between the top wall 220 and the valve plate 306. As shown, each of the top wall 220 and the valve plate 306 can be configured to maintain the compression spring 308 centered on the actuator stem 304. By way of example, an underside of the top wall 220 includes a circular flange 248 centered on the opening 234 for retaining an upper part of the compression spring 308, and the valve plate 306 includes a seat 310 also centered on the opening 234 for retaining a lower part of the compression spring 308. It should be appreciated that displacement of the valve plate 306 from a resting position toward the top wall 220 displaces the valve seal 302 from its closed position. Further depicted, a wall 312 extends from the valve plate 306 towards the top wall 220 and inwardly of the side wall 222 of the inner base 204. The wall 312 is provided to contact the top wall 220, limiting the upward displacement of the valve plate 306 from its resting position, and the valve seal 302 from its closed position.

The beverage brewing apparatus 100 further includes a filter assembly 400 secured between the body 102 and the base 200. According to one aspect, and as shown in FIGS. 3 and 4, the filter assembly 400 includes a filter 402 having a peripheral edge 404 and a gasket 406 disposed on the peripheral edge 404. The gasket 406 is seated on an upper surface 250 of the horizontal segment 232 of the side portion 228. The gasket 406 is configured to provide an interference fit between the body 102 and the base 200. The gasket 406 may be silicone, or another material that can be effectively compressed when the beverage brewing apparatus 100 is assembled, thereby creating a seal. In the depicted aspect, the gasket 406 is an overmolded gasket that is overmolded onto the peripheral edge 404, forming a vertical section 408 and a flange section 410 extending outwardly from the vertical section 408. The vertical section 408 of the gasket 406 includes an inner surface 412 facing the side portion 228 of the top wall 220 when the beverage brewing apparatus 100 is assembled. The vertical section 408 of the gasket 406 also includes an outer surface 414 facing the inner surface 120 of the flange 118 provided on the body 102 when the beverage brewing apparatus 100 is assembled.

When the beverage brewing apparatus 100 is assembled, the vertical section 408 of the gasket 406 is configured to be spaced between the body 102 and side portion 228. More particularly, as shown in FIGS. 3-5 the vertical section 408 is spaced from both the inner surface 120 of the flange 118 and the side portion 228 of the top wall 220. This spacing forms a first gap 416 between the outer surface 414 of the gasket 406 and the inner surface 114 of the flange section 410 (i.e., the body side wall 106), and a second gap 418 between the inner surface 412 of the gasket 406 and the vertical segment 230 of the side portion 228 (i.e., the base 200). The first and second gaps 416, 418 prevent excessive friction between the gasket 406, the body 102, and the base 200, as the base 200 is being screwed onto the body 102. This, in turn, allows for ease of assembly of the base 200 onto the body 102. In the assembled condition of the beverage brewing apparatus 100, the flange section 410 of the gasket 406 is compressed between the body side wall 106 and the base 200, more particularly between the flange 118 and the horizontal segment 232 of the side portion 228. As depicted in FIG. 6, the top protrusions 244 extending through the horizontal segment 230 of the side portion 228 contact the gasket 406 of the filter assembly 400. As depicted in FIGS. 2, 3, and 6 the base openings 242 and the top protrusions 244 are located in a circular pattern that is concentric with the gasket 406.

As depicted in FIGS. 2-5, the filter 402 may be a metal disk with through holes disposed therein for filtering a brewed beverage, and supported by the at least one ridge 236 extending from the top wall 220 of the base 200. To provide a secured connection between the peripheral edge 404 of the filter 402 and the gasket 406, the peripheral edge 404 is bent into a bent section 420, and the vertical section 408 is overmolded onto the bent section 420. The filter 402 may include at least one rib 422 configured for adding rigidity to the filter 402. The filter 402 also includes a handle 424 mounted on a projection 426 provided on the filter, which extends into the interior of the body 102 when the beverage brewing apparatus 100 is assembled.

Figure 8:
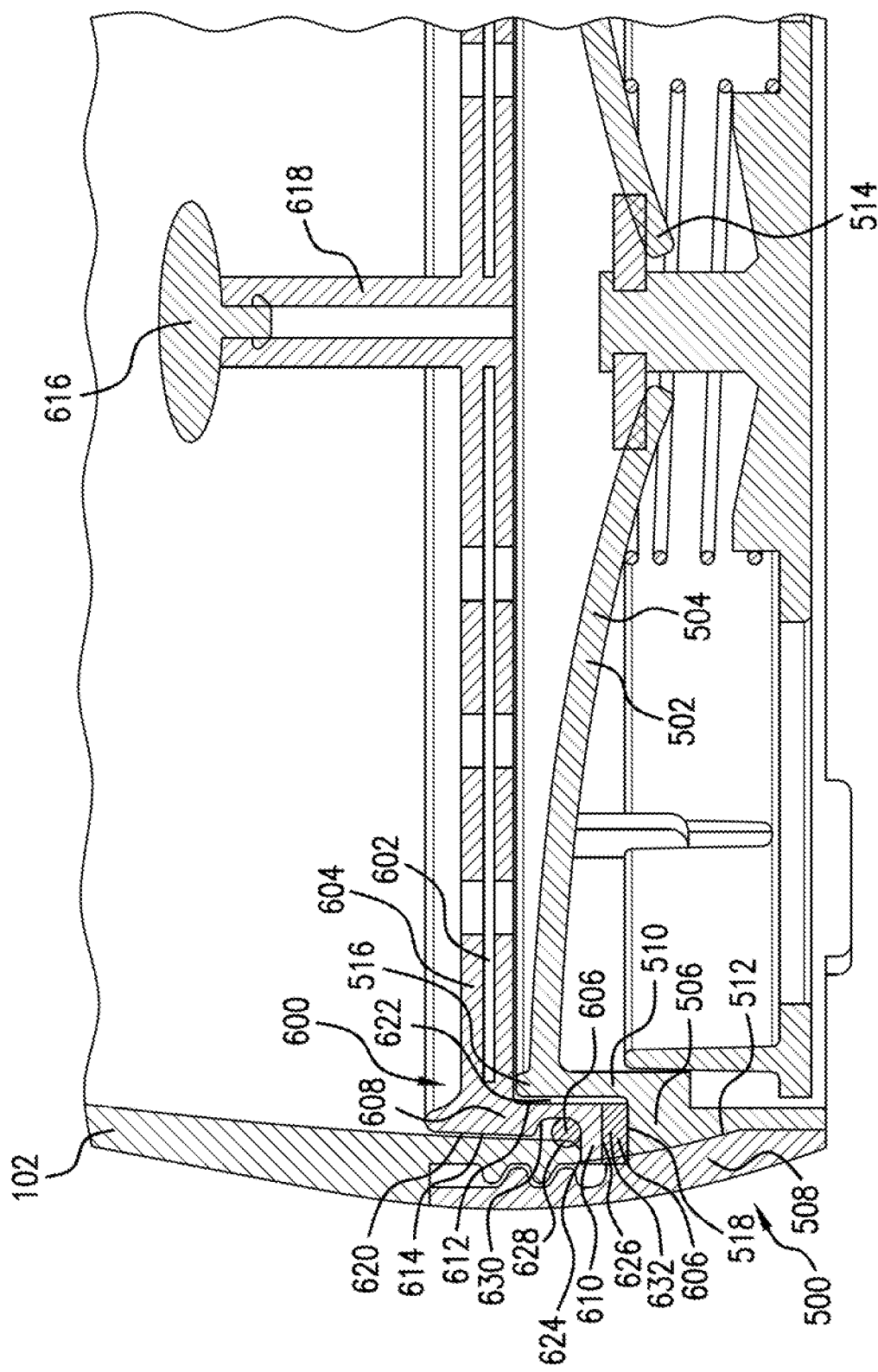
FIG. 8 is a partial, cross-sectional view of the beverage brewing apparatus according to another aspect of the present disclosure.
Figure 9:
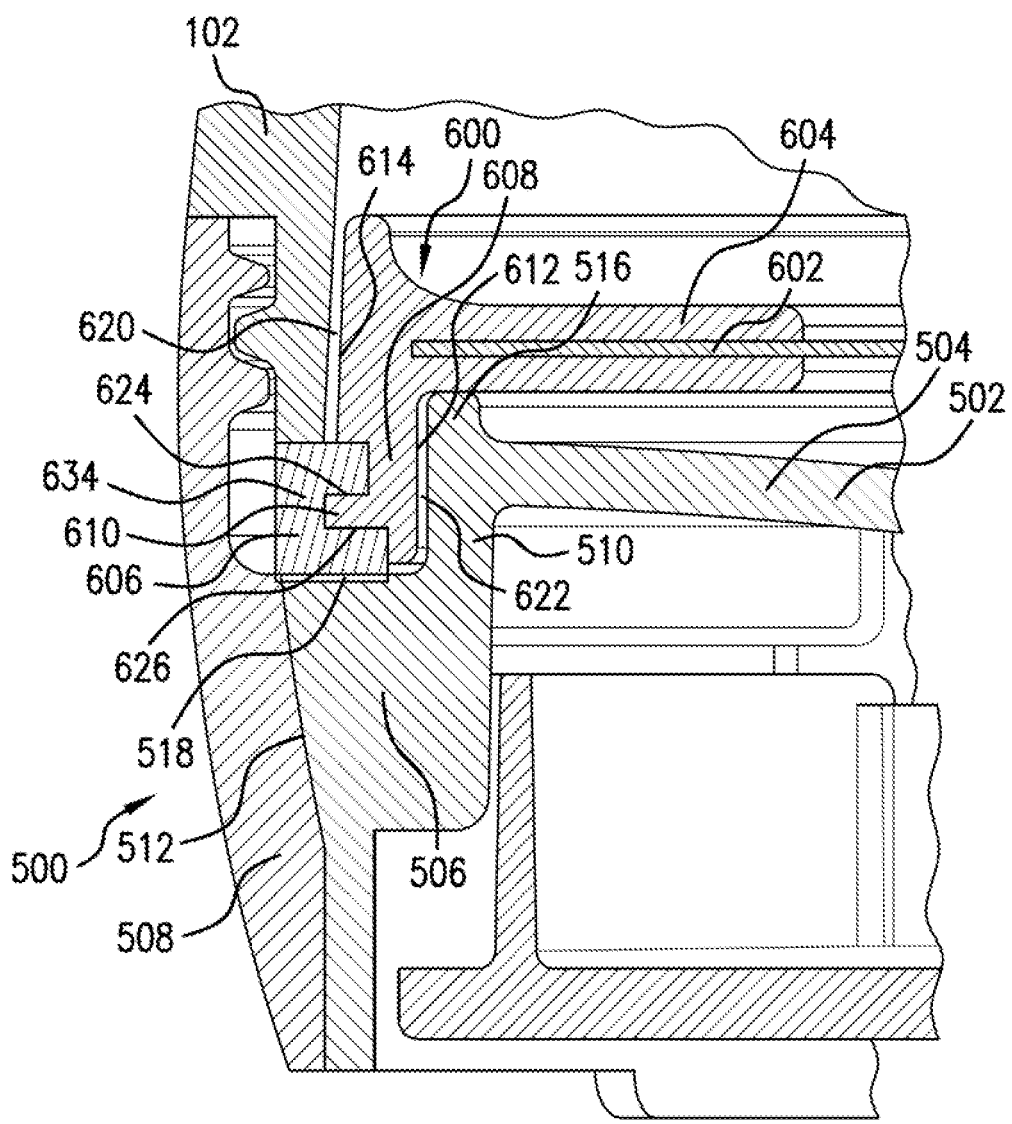
FIG. 9 is a partially enlarged view of FIG. 8.

FIGS. 8 and 9 depict another aspect of a base 500 for use with the beverage brewing apparatus 100. In the depicted aspect, the base 500 securely receives a funnel member 502. The funnel member 502 includes a top wall 504 and a side wall 506. It should be appreciated that the side wall 506 can be wedge shaped for engaging a base side wall 508, and this engagement prevents downward movement of the funnel member 502 within the base 500.

As depicted in FIGS. 8 and 9, the side wall 506 can include a generally L-shaped side portion 510 which extends inwardly from an inner surface 512 of the base side wall 508. The top wall 504 can be generally funnel shaped having a central opening 514 which allows for a brewed beverage to flow through the funnel member 504. The top wall 504 can further integrally include at least one outwardly extending ridge 516, which may be disposed about the periphery of the top wall 504 inwardly of the side portion 510. As described, the funnel member 502 is separate from the base 500; although, it should be appreciated that the funnel member 504 can be integral with the base 500 to define a unitary, one-piece structure.

FIGS. 8 and 9 also depict another aspect of a filter assembly 600. Similar to the filter assembly 400, the filter assembly 600 is secured between the body 102 and the base 500 with the funnel member 502 mounted thereto when the beverage brewing apparatus 100 is assembled. The filter assembly 600 includes a filter 602, a casing 604, and at least one gasket 606. A gasket 606 of the at least one gasket 606 is seated on a ledge 518 defined by the side wall 506, particularly the side portion 510 of the funnel member 502. The filter 602 is a wire mesh configured to filter a brewed beverage. The filter is fixed inside the casing 604. By way of example, the casing 604 can be an overmolded casing that is overmolded over the wire mesh filter, forming a vertical section 608 and a flange section 610 extending outwardly from the filter assembly 600 toward the inner surface 512 of the base 500. The vertical section 608 of the casing 604 includes an inner surface 612 facing the side portion 510 of the top wall 504 of the funnel member 502 when the beverage brewing apparatus 100 is assembled. The vertical section 608 also includes an outer surface 614 facing the inner surface 120 of the flange 118 provided at the open bottom portion 112 of the body 102 when the beverage brewing apparatus 100 is assembled. The casing 604 can also include a handle 616 mounted on a projection 618 provided on the casing 604, which extends into the interior of the body 102 when the beverage brewing apparatus 100 is assembled.

When the beverage brewing apparatus 100 is assembled, the vertical section 608 of the casing 604 is spaced between the body 102 and the funnel member 502 mounted within the base 500. More particularly, the vertical section 608 is spaced from both the inner surface 120 of the flange 118 and the side portion 510 of the side wall 506 of the funnel member 502. This spacing forms a first gap 620 between the outer surface 614 of the casing 604 and the inner surface 120 of the flange section 118 (i.e., the body side wall 106), and a second gap 622 between the inner surface 612 of the casing 604 and the funnel member 502 (i.e. the base 500). Similar to the embodiment previously described, the first and second gaps 620, 622 prevent excessive friction between the casing 604, the body 102, and the base 500 (together with the funnel member 502) as the base 500 is being screwed onto the body 102.

Further depicted, the flange section 610 has an upper side 624 facing the body 102 and a lower side 626 facing the base 500, when the beverage brewing apparatus 100 is assembled. The at least one gasket 606 is disposed between the flange section 610 and the body side wall 106, and between the flange section 610 and the ledge 518 defined by the side wall 506 of the funnel member 502. The at least one gasket 606 may include a first gasket 628, for example an O-ring seated in a recess or groove 630 adjacent to the flange section 610, and a second gasket 632 seated between the base 200 and the flange section 610. In the assembled condition of the beverage brewing apparatus 100 with the filter assembly 600, the first gasket 628 is compressed between the outer surface 614 of the casing 604 and the body side wall 106. Also, in the assembled condition of the beverage brewing apparatus 100, the second gasket 632 is compressed between the flange section 610 and the base 500, more particularly between the flange section 610 and the ledge 518 defined by the side wall 506 of the funnel member 502.

Alternatively, as illustrated in FIG. 9, the at least one gasket 606 may be a single gasket 634 disposed around both the upper side 624 of the flange section 610 and the lower side 626 of the flange section 610. The at least one gasket 606 may be silicone, or another material that can be effectively compressed between the base 500 and the body 102 when the beverage brewing apparatus 100 is assembled, thereby creating a seal. In the assembled condition of the beverage brewing apparatus 100, the gasket 634 is compressed between the body 102 and the base 500, more particularly between the ledge 518 defined by the side wall 506, and the base 500. The at least one gasket 606 may be configured to provide an interference fit between the outer surface 614 of the casing 604 and the inner surface of the body 102, helping to maintain the first and second gaps 620, 622.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A beverage brewing apparatus, comprising:
a body including a body side wall having an inner surface defining an interior of the body and an outer surface defining an exterior of the body;
a base removably connected to the body, the base including a base side wall and a top wall, the base side wall having an inner surface defining an interior of the base and an outer surface defining an exterior of the base;
a valve assembly mounted to the base, the valve assembly including a valve plate and a valve seal connected to the valve plate, the valve seal movable from a closed position where the valve seal is in contact with the top wall and an open position; and
a filter assembly mounted to the base, the filter assembly including a filter having a peripheral edge and a gasket having a flange, the gasket secured to the peripheral edge of the filter, wherein assembling the body, base, and filter assembly secures the gasket flange between the body and the base,
wherein the gasket includes a vertical section having an inner surface spaced from the base and an outer surface spaced from the body, the outer surface of the gasket vertical section and the body define an outer gap therebetween, and the inner surface of the gasket vertical section and the base define an inner gap therebetween.

2. The beverage brewing apparatus of claim 1, wherein the gasket is configured to provide an interference fit between the base and body.

3. The beverage brewing apparatus of claim 1, wherein the peripheral edge of the filter is vertically bent and disposed within a vertical section of the gasket.

4. The beverage brewing apparatus of claim 3, wherein the gasket is an overmolded gasket that is overmolded onto the peripheral edge of the filter.

5. The beverage brewing apparatus of claim 1, wherein the filter is a metal filter and includes at least one ridge configured to provide structural rigidity to the filter.

6. The beverage brewing apparatus of claim 1, wherein the top wall of the base includes at least one ridge configured to support the filter assembly.

7. The beverage brewing apparatus of claim 1, further comprising:
a side portion which extends between the inner surface of the base side wall and the top wall.

8. The beverage brewing apparatus of claim 7, wherein the side portion is generally L-shaped, including a substantially vertical segment, and a substantially horizontal segment extending between the base side wall and top wall.

9. The beverage brewing apparatus of claim 1, further comprising:
 an inner base, wherein the base side wall, the top wall, and a side portion extending between the inner surface of the base side wall and the top wall define an outer base, and the inner surface of the base side wall is configured to retain the inner base within the outer base.

10. The beverage brewing apparatus of claim 9, wherein the side portion of the outer base defines base openings, and top protrusions extending upwardly from the inner base extend through the base openings when the beverage brewing apparatus is assembled.

11. The beverage brewing apparatus of claim 10, wherein the gasket is seated on the side portion and the top protrusions extending through the base openings contact the gasket.

12. The beverage brewing apparatus of claim 10, wherein the base openings and the top protrusions are located in a circular pattern that is concentric with the gasket.

13. A beverage brewing apparatus, comprising:
 a body including a body side wall having an inner surface defining an interior of the body and an outer surface defining an exterior of the body;
 a base removably connected to the body, the base including a base side wall and a top wall, the base side wall having an inner surface defining an interior of the base and an outer surface defining an exterior of the base;
 a valve assembly mounted to the base, the valve assembly including a valve plate and a valve seal connected to the valve plate, the valve seal movable from a closed position where the valve seal is in contact with the top wall and an open position; and
 a filter assembly mounted to the base, the filter assembly including a filter having a peripheral edge and a gasket having a flange, the gasket secured to the peripheral edge of the filter, wherein assembling the body, base, and filter assembly secures the gasket flange between the body and the base,
 wherein the top wall of the base includes at least one ridge configured to support the filter assembly.

14. The beverage brewing apparatus of claim 13, wherein the gasket includes a vertical section having an inner surface spaced from the base and an outer surface spaced from the body, the outer surface of the gasket vertical section and the body define an outer gap therebetween, and the inner surface of the gasket vertical section and the base define an inner gap therebetween.

15. The beverage brewing apparatus of claim 13, wherein the gasket is configured to provide an interference fit between the base and body.

16. The beverage brewing apparatus of claim 13, wherein the base includes an outer base and an inner base, a side portion of the outer base defines base openings, and the inner base includes upwardly extended top protrusions, the top protrusions extending through the base openings when the beverage brewing apparatus is assembled.

* * * * *